(12) United States Patent
Chen

(10) Patent No.: US 6,491,388 B1
(45) Date of Patent: Dec. 10, 2002

(54) FRAME AND LENS ARRANGEMENT FOR EYEGLASSES

(75) Inventor: Pen-Wei Chen, Tainan (TW)

(73) Assignee: Prohero Trading Co., Ltd., Tainan (TW)

(*) Notice: Subject to any disclaimer, the term of this patent is extended or adjusted under 35 U.S.C. 154(b) by 0 days.

(21) Appl. No.: 10/144,854

(22) Filed: May 15, 2002

(51) Int. Cl.$^7$ .................................. G02C 1/00

(52) U.S. Cl. ............................ 351/86; 351/85

(58) Field of Search ....................... 351/86, 83, 90, 351/92, 103, 106, 41, 85

(56) References Cited

U.S. PATENT DOCUMENTS

| | | | | |
|---|---|---|---|---|
| 5,576,777 A | * | 11/1996 | Gioacchini | 351/86 |
| 5,602,603 A | * | 2/1997 | Bondet | 351/41 |
| 6,074,059 A | * | 6/2000 | Glass et al. | 351/86 |

* cited by examiner

*Primary Examiner*—Hung Xuan Dang
(74) *Attorney, Agent, or Firm*—Jones, Tullar & Cooper, P.C.

(57) ABSTRACT

A frame and lens arrangement for eyeglasses in which the frame has two front recesses respectively disposed in communication with the lens mounting grooves thereof and two pairs of retaining projections respectively bilaterally disposed in the front recesses, and the lenses each have a protruded portion fitting the front recesses and two stop edges at two sides of the protruded portions for friction engagement with the retaining projections.

1 Claim, 5 Drawing Sheets

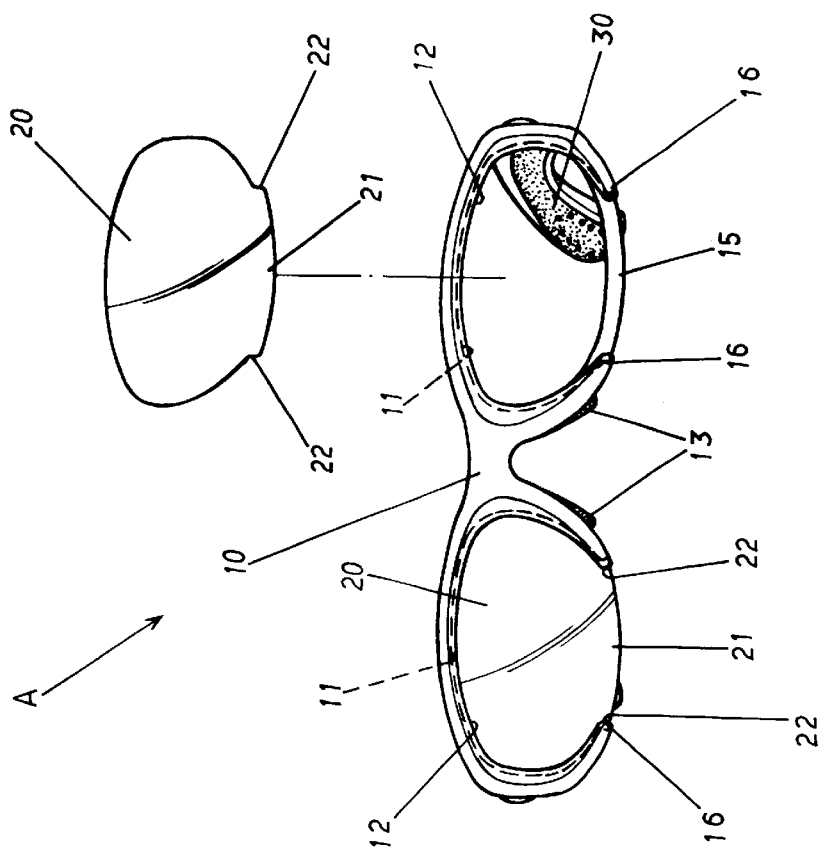
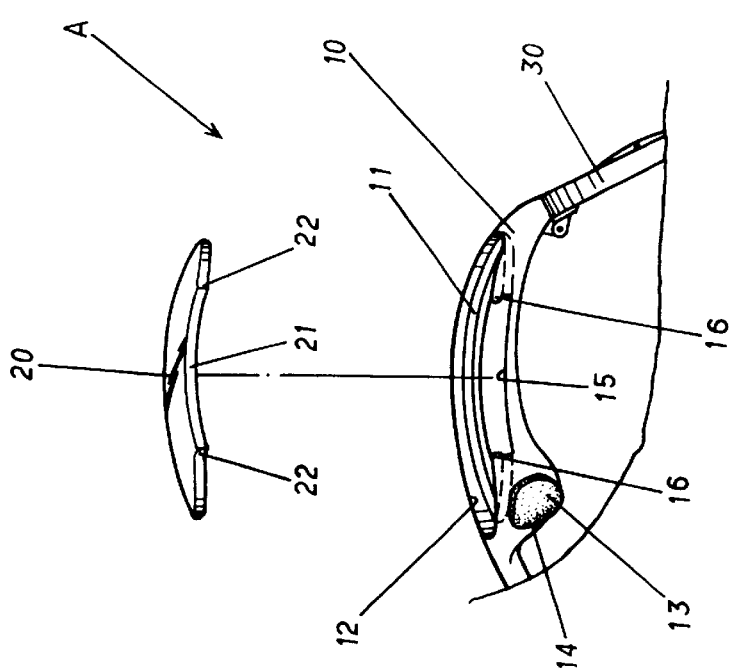
Fig.4
Fig.3

FRAME AND LENS ARRANGEMENT FOR EYEGLASSES

BACKGROUND OF THE INVENTION

1. Field of the Invention

The present invention relates to eyeglasses and, more particularly, to a frame and lens arrangement for eyeglasses, which enables the user to replace the lenses conveniently.

2. Description of the Related Art

The lenses of regular eyeglasses are commonly of a monochromic design. During installation, the lenses are directly forced into position. When dismounting the lenses for a replacement, much force should be employed to the lenses against resisting force from the frame around each lens mounting opening. When employing force to the lenses against the frame, the lenses tend to be broken or, the frame tends to be deformed. Therefore, it is desirable to provide a frame and lens arrangement for eyeglasses, which enables the user to conveniently replace the lenses subject to different situations or weather conditions.

SUMMARY OF THE INVENTION

The present invention has been accomplished under the circumstances in view.

It is the main object of the present invention to provide a frame and lens mounting arrangement for eye glasses, which enables the user to mount/dismount the lenses conveniently with less effort.

It is another object of the present invention to provide a frame and lens mounting arrangement for eyeglasses, which enables the user to replace the lenses separately.

It is still another object of the present invention to provide a frame and lens arrangement for eyeglasses, which enables the user to replace the lenses easily and safely without deforming the frame.

To achieve these and other objects of the present invention, the frame of the eyeglasses comprises two front recesses respectively disposed in communication with the lens mounting grooves thereof and two pairs of retaining projections respectively bilaterally disposed in the front recesses, and the lenses each have a protruded portion fitting the front recesses and two stop edges at two sides of the protruded portions for friction engagement with the retaining projections. The front recesses can be made at the bottom side or the top side in the front of the frame. The protruded portion of each lens is provided corresponding to the position of the front recesses in the front of the frame.

BRIEF DESCRIPTION OF THE DRAWINGS

FIG. 3 is an exploded bottom view of a part of the present invention.

FIG. 4 is an exploded front view of the present invention.

DETAILED DESCRIPTION OF THE PREFERRED EMBODIMENT

Figure 1:
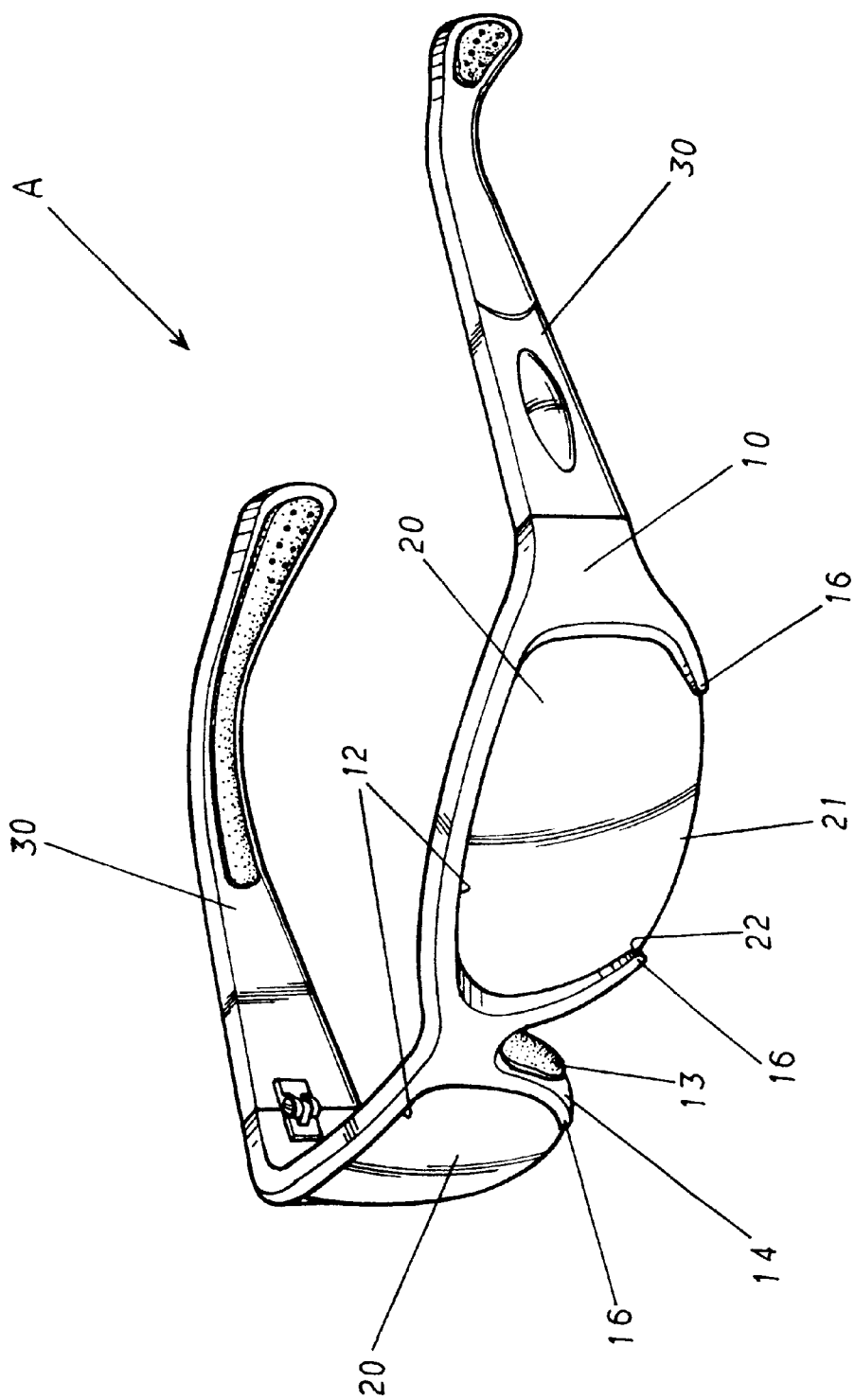
FIG. 1 is perspective view of an eyeglasses constructed according to the present invention.
Figure 2:
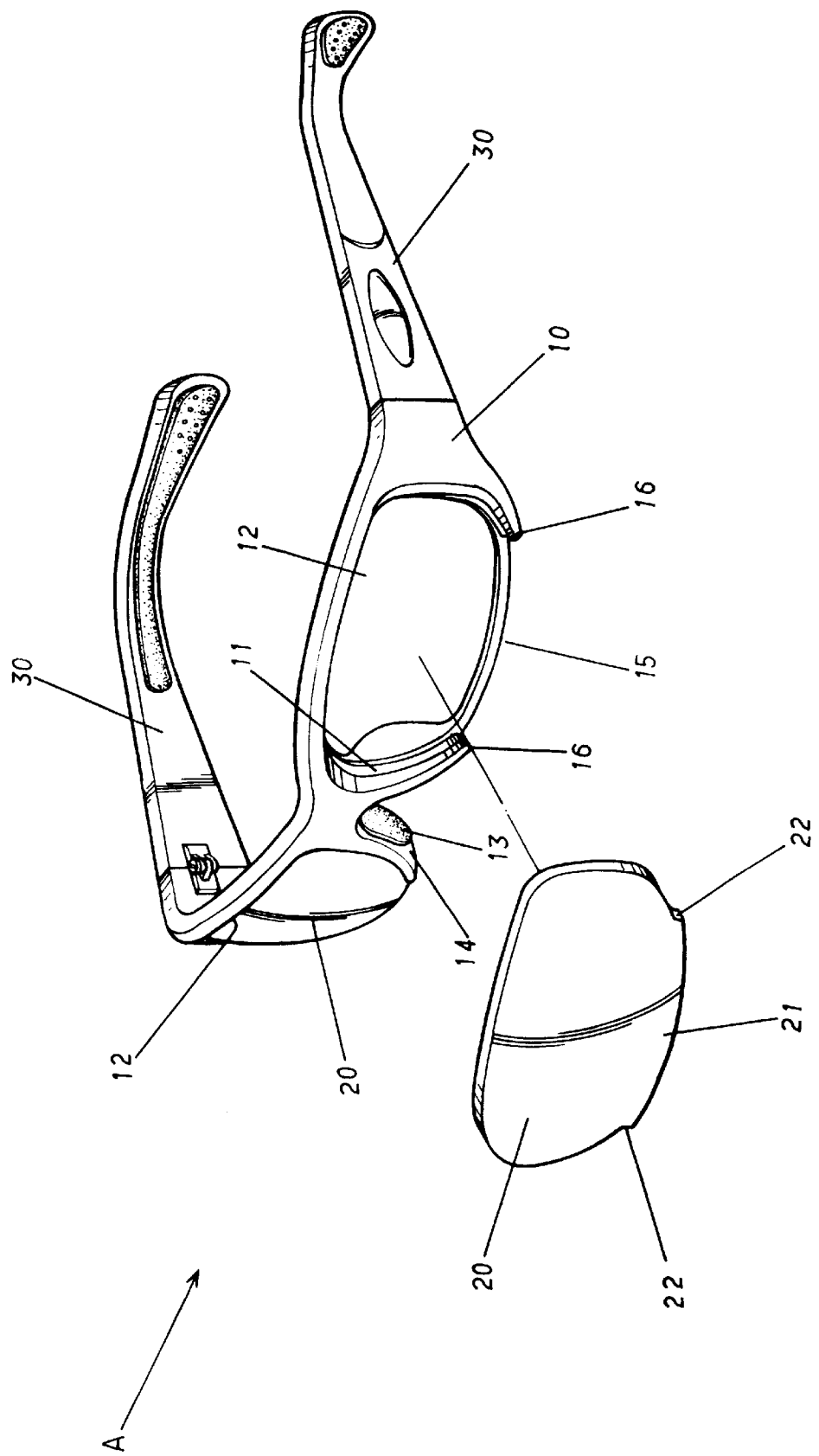
FIG. 2 is an exploded view of the eyeglasses shown in FIG. 1.

Referring to FIGS. 1 and 2, an eyeglasses A is shown comprising a frame 10 and two lenses 20. The frame 10 comprises two openings 12 symmetrically disposed in the front at two sides of the bridge thereof, two mounting grooves 11 respectively disposed in the front around the openings 12, two pad arms 14 respectively backwardly protruded from the back side of the front on the middle corresponding to the openings 12, and two nose pads 13 respectively pivoted to the pad arms 14 (the nose pads 13 each having a pad plate embedded therein and respectively pivoted to the pad arms 14). The lenses 20 are respectively mounted in the mounting grooves 11 of the frame 10 and covered over the openings 12.

Figure 5:
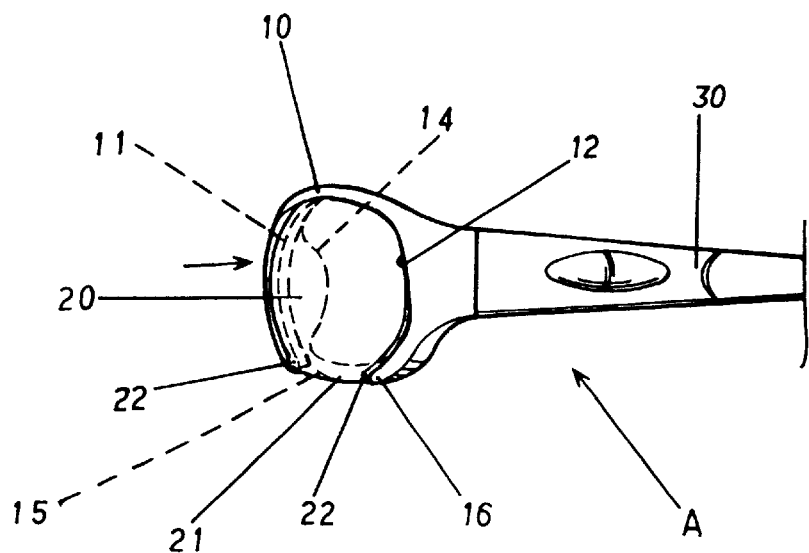
FIG. 5 is a schematic drawing showing the lens installation action according to the present invention (I).
Figure 6:
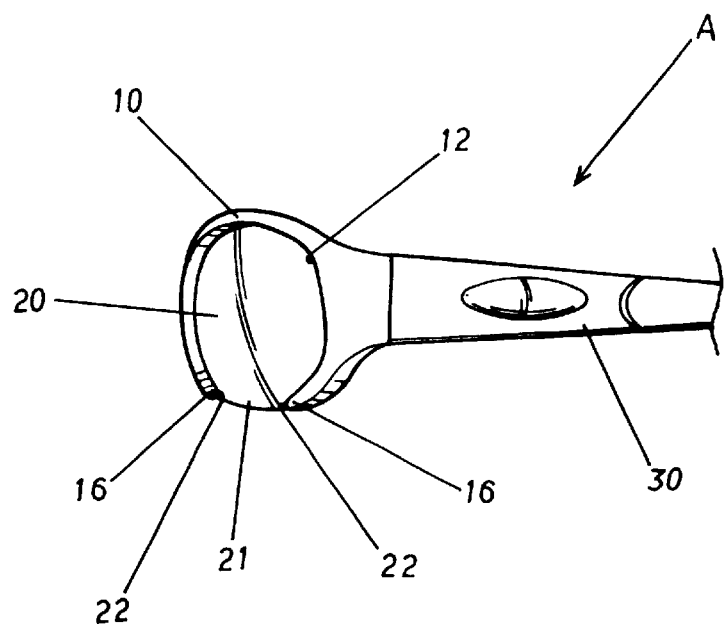
FIG. 6 is a schematic drawing showing the lens installation action according to the present invention (II).

The main features of the present invention are outlined hereinafter with reference to FIGS. from 3 through 6. The frame 10 comprises two front recesses 15 respectively disposed in the front in communication with the mounting grooves 11 and the openings 12 at the bottom side, and two pairs of retaining projections 16 respectively bilaterally disposed in the front recesses 15 (see FIG. 3). The lenses 20 each have a protruded portion 21 disposed at the bottom side corresponding to the front recesses 15 of the frame 10, and two stop edges 22 at two sides of the bottom protruded portions 21 (see FIG. 4). During installation, the lenses 20 are respectively inserted into the mounting grooves 11 (see FIG. 5), and then pressed with the fingers to engage the protruded portions 21 into the front recesses 15, causing the stop edges 22 to be forced into friction engagement with the retaining projections 16 (see FIG. 6), and therefore the lenses 20 are firmly set in position and secured to the frame 10.

When replacing the lenses 20, pull the protruded portions 21 outwards from the front recesses 15 to disengage the stop edges 22 from the retaining projections 16, for enabling the lenses 20 to be easily removed from the mounting grooves 11 of the frame 10.

Figure 7:
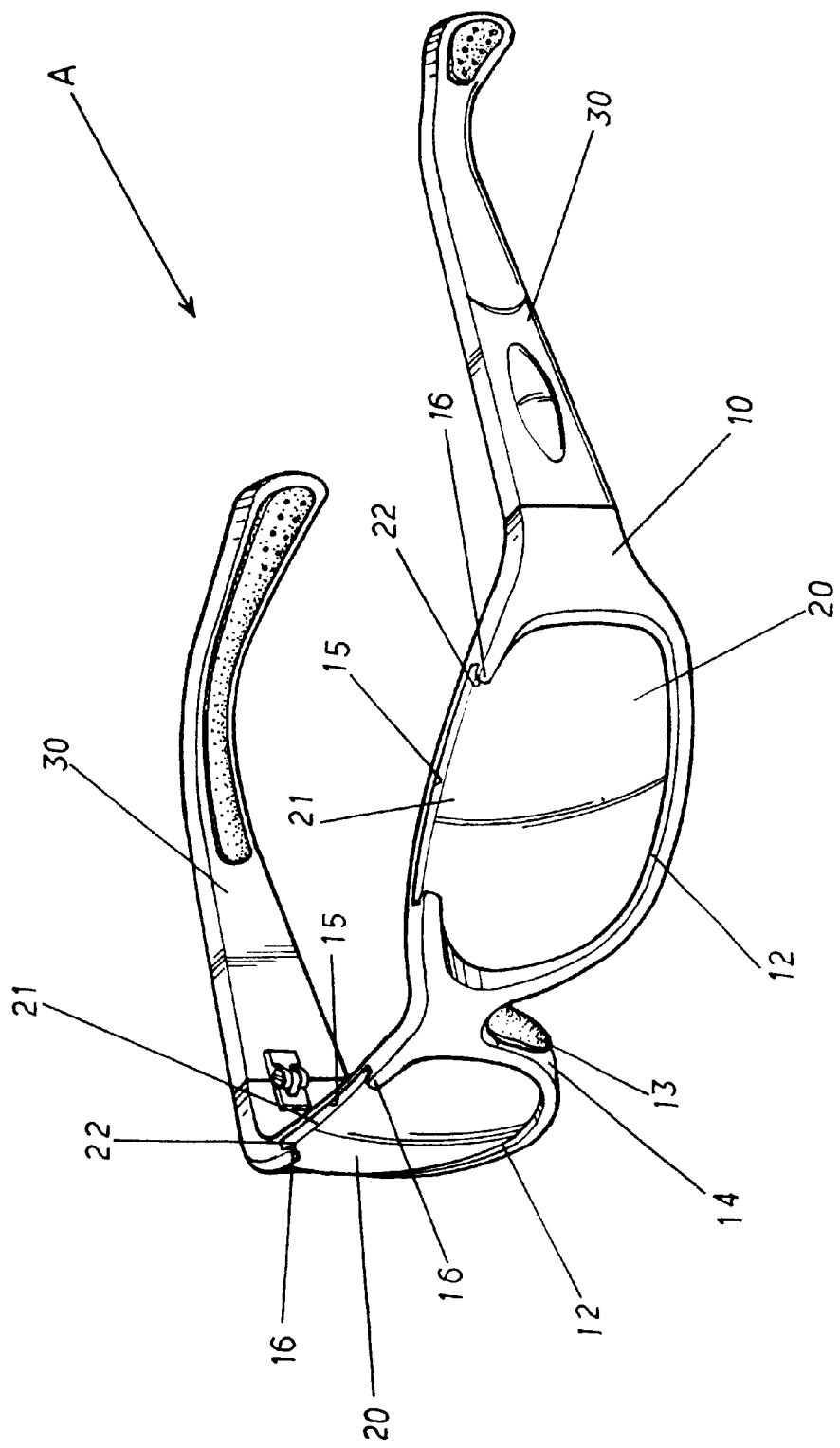
FIG. 7 is a perspective view of an eyeglasses constructed according to an alternate form of the present invention.

FIG. 7 shows an alternate form of the present invention. According to this alternate form, the front recesses 15 are disposed in the front of the frame 10 at the top side, and the protruded portions 21 of the lenses 20 are disposed at the top side corresponding to the front recesses 15 of the frame 10.

A prototype of frame and lens arrangement for eyeglasses has been constructed with the features of FIGS. 1~7. The folding collapsible functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A frame and lens arrangement for eyeglasses comprising:

a frame, said frame comprising two openings symmetrically disposed in a front thereof at two sides of a bridge thereof, two mounting grooves respectively disposed in said front around said openings, two pad arms respectively backwardly protruded from a back side of said front on the middle, and two nose pads respectively pivoted to said pad arms; and two lenses respectively mounted in said mounting grooves of said frame and covered over said openings;

wherein:

said frame comprises two front recesses respectively disposed in said front in communication with said mounting grooves and said openings, and two pairs of retaining projections respectively bilaterally disposed in said front recesses;

said lenses each have a protruded portion fitting said front recesses of said frame, and two stop edges at two sides of said protruded portions for friction engagement with said retaining projections of said frame.

* * * * *